United States Patent
Klett et al.

(10) Patent No.: US 9,906,078 B2
(45) Date of Patent: Feb. 27, 2018

(54) INFRARED SIGNAL GENERATION FROM AC INDUCTION FIELD HEATING OF GRAPHITE FOAM

(71) Applicants: UT-Battelle, LLC, Oak Ridge, TN (US); Spectrum FML, Inc., Fredricksburg, VA (US)

(72) Inventors: James W. Klett, Knoxville, TN (US); Orlando Rios, Knoxville, TN (US); Richard L. Moyers, Knoxville, TN (US); John E. Monk, Fredericksburg, VA (US); Roger Kisner, Knoxville, TN (US)

(73) Assignees: UT-BATTELLE, LLC, Oak Ridge, TN (US); SPECTRUM FML, INC., Fredricksburg, VA (US)

( * ) Notice: Subject to any disclaimer, the term of this patent is extended or adjusted under 35 U.S.C. 154(b) by 616 days.

(21) Appl. No.: 14/466,544

(22) Filed: Aug. 22, 2014

(65) Prior Publication Data
US 2016/0057830 A1    Feb. 25, 2016

(51) Int. Cl.
*H05B 33/08* (2006.01)
*H02J 50/20* (2016.01)
(Continued)

(52) U.S. Cl.
CPC .......... *H02J 50/20* (2016.02); *C04B 38/0022* (2013.01); *F28F 21/02* (2013.01)

(58) Field of Classification Search
CPC .......... H05B 6/105; H05B 6/10; H05B 33/08; F24H 1/0018
(Continued)

(56) References Cited

U.S. PATENT DOCUMENTS 3,107,152 A * 10/1963 Ford .................. D01F 9/16
174/36
3,116,392 A * 12/1963 Morey .................. H05B 6/108
219/628

(Continued)

FOREIGN PATENT DOCUMENTS

| CN | 102494315 | 6/2012 |
| CN | 202719427 | 2/2013 |
| WO | 2013099759 | 7/2013 |

OTHER PUBLICATIONS

Ambrell Precision Induction heating (URL: www.ambrell.com/PDFo/411-0169-10.pdf), p. 1. What is induction heating?, Paragraph 1-3.*

(Continued)

*Primary Examiner* — Dana Ross
*Assistant Examiner* — Kuangyue Chen
(74) *Attorney, Agent, or Firm* — Fox Rothschild LLP

(57) ABSTRACT

A magneto-energy apparatus includes an electromagnetic field source for generating a time-varying electromagnetic field. A graphite foam conductor is disposed within the electromagnetic field. The graphite foam when exposed to the time-varying electromagnetic field conducts an induced electric current, the electric current heating the graphite foam to produce light. An energy conversion device utilizes light energy from the heated graphite foam to perform a light energy consuming function. A device for producing light and a method of converting energy are also disclosed.

34 Claims, 17 Drawing Sheets

(51) Int. Cl.
*C04B 38/00* (2006.01)
*F28F 21/02* (2006.01)

(58) Field of Classification Search
USPC ............ 219/643; 315/32; 250/504 R; 313/11
See application file for complete search history.

(56) References Cited

U.S. PATENT DOCUMENTS

| | | | | |
|---|---|---|---|---|
| 3,411,123 | A * | 11/1968 | Kydd | H05B 3/06 |
| | | | | 219/388 |
| 3,980,496 | A | 9/1976 | Ludwig et al. | |
| 4,803,370 | A | 2/1989 | Eckles | |
| 5,061,835 | A | 10/1991 | Iguchi | |
| 5,140,118 | A * | 8/1992 | Catanese | C21D 1/42 |
| | | | | 148/520 |
| 5,481,091 | A * | 1/1996 | Grimm | B23K 13/02 |
| | | | | 156/274.2 |
| 6,033,506 | A | 3/2000 | Klett et al. | |
| 6,037,032 | A | 3/2000 | Klett et al. | |
| 6,217,800 | B1 * | 4/2001 | Hayward | C04B 14/022 |
| | | | | 264/109 |
| 6,261,485 | B1 | 7/2001 | Klett et al. | |
| 6,344,159 | B1 | 2/2002 | Klett | |
| 6,387,343 | B1 | 5/2002 | Klett | |
| 6,398,994 | B1 | 6/2002 | Klett | |
| 6,430,935 | B1 | 8/2002 | Klett et al. | |
| 6,491,891 | B1 | 12/2002 | Klett et al. | |
| 6,654,549 | B1 | 11/2003 | Konishi | |
| 6,673,328 | B1 * | 1/2004 | Klett | C04B 38/00 |
| | | | | 423/445 R |
| 6,729,269 | B2 | 5/2004 | Ott et al. | |
| 6,763,671 | B1 | 7/2004 | Klett et al. | |
| 6,780,505 | B1 | 8/2004 | Klett et al. | |
| 6,809,304 | B2 | 10/2004 | Besmann et al. | |
| 7,018,093 | B2 | 3/2006 | Park et al. | |
| 7,070,755 | B2 | 7/2006 | Klett et al. | |
| 7,147,214 | B2 | 12/2006 | Klett et al. | |
| 7,258,836 | B2 | 8/2007 | Hill et al. | |
| 7,670,682 | B2 | 3/2010 | Klett et al. | |
| 8,133,826 | B2 | 3/2012 | Klett et al. | |
| 8,350,198 | B2 | 1/2013 | Belsh et al. | |
| 9,017,598 | B2 | 4/2015 | Menchhofer et al. | |
| 9,080,818 | B2 | 7/2015 | Maurer et al. | |
| 9,083,062 | B2 * | 7/2015 | Kumar | H01M 4/131 |
| 9,464,847 | B2 | 10/2016 | Maurer et al. | |
| 9,528,785 | B2 | 12/2016 | Klett et al. | |
| 9,739,501 | B2 | 8/2017 | Klett et al. | |
| 2003/0115753 | A1 | 6/2003 | Klett et al. | |
| 2003/0162007 | A1 | 8/2003 | Klett et al. | |
| 2005/0095168 | A1 | 5/2005 | Centanni et al. | |
| 2009/0049871 | A1 | 2/2009 | Klett et al. | |
| 2009/0087373 | A1 | 4/2009 | Klett et al. | |
| 2010/0051607 | A1 | 3/2010 | Yang et al. | |
| 2010/0186422 | A1 | 7/2010 | Yang et al. | |
| 2012/0049239 | A1 | 3/2012 | Sung | |
| 2012/0107555 | A1 * | 5/2012 | Miller | B29C 33/3828 |
| | | | | 428/141 |
| 2012/0183116 | A1 | 7/2012 | Hollenbach et al. | |
| 2012/0199330 | A1 | 8/2012 | Maurer et al. | |
| 2012/0199331 | A1 | 8/2012 | Maurer et al. | |
| 2012/0199334 | A1 | 8/2012 | Maurer et al. | |
| 2012/0255718 | A1 | 10/2012 | Klett et al. | |
| 2014/0017159 | A1 | 1/2014 | Hsiao | |
| 2014/0291690 | A1 * | 10/2014 | Yi | H01L 33/32 |
| | | | | 257/76 |
| 2016/0057814 | A1 | 2/2016 | Klett et al. | |

OTHER PUBLICATIONS

International Search Report and The Written Opinion of the International Searching Authority, dated Jan. 6, 2016, pp. 1-18.

Lin, Wamel et al., Review on graphite foam as a thermal material for heat exchangers, Department of Energy Sciences, Lund University, Sweden. Energy End-Use Efficiency Issues (EEE), World Renewable Energy Congress \lay 2011; p. 748-755.

Drummond, Kevin, Thermal Characterization of Graphitic Foams for Use in Thermal Storage Applications. Department of Mechanical Engineering, Russ College of Engineering and Technology. Dec. 2012; 105pp.

Coppers, Kfoam Product Brochure. Jul. 20, 2014; Conductivity, Low Density, Property; retrieved from internet <URL: <http://www.koppers.com/pages/kfoam>>.

Klett, James et al. High thermal conductivity mesophase pitch-derived carbon foams: effect on precursor on structure and properties. Oak Ridge National Laboratory, Oak Ridge Tennessee, Carbon, vol. 38, Issue 7, 2000, 3 pgs.

The International Search Report and The Written Opinion of the International Searching Authority, dated Nov. 24, 2015, pp. 1-11.

* cited by examiner

INFRARED SIGNAL GENERATION FROM AC INDUCTION FIELD HEATING OF GRAPHITE FOAM

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to energy conversion methods and devices, and more particularly to energy conversion methods and devices for generating light.

BACKGROUND OF THE INVENTION

Infrared signaling has many applications. A common application is in the field of aviation. The infrared signal can be detected by aircraft in the weather conditions where visible light cannot readily be detected. Traditional incandescent bulbs (colored as needed) convert 95% of the supplied energy to heat, thus producing infrared energy. Hence, as new sensing technologies have been developed infrared imagers have been placed in the cockpits of airplanes. The infrared imagers assist pilots to see images of the runway landing area in inclement weather, increasing safety. The United States Federal Aviation Administration has therefore promulgated rules for aircraft approach lights which include infrared signaling.

The advent of LED lights, which can be 95% efficient or more, has reduced the infrared signal that can be detected. There is little heat generated by LEDs which can be detected by the infrared imagers on the planes. These imagers primarily view in the 760 nm to 2000 nm wavelengths, and hence, an added method to generate IR signals in these wavelengths is needed.

Carbon foams are known to have many desirable properties. These properties include high thermal conductivity, and a very high specific thermal conductivity which can be 4 times that of copper. Examples of such foams and of methods to prepare such foams can be found in U.S. Pat. No. 6,033,506, U.S. Pat. No. 6,261,485, U.S. Pat. No. 6,387,343, and U.S. Pat. No. 6,673,328, the disclosures of which are hereby incorporated fully by reference.

SUMMARY OF THE INVENTION

A magneto-energy apparatus includes an electromagnetic field source for generating a time-varying electromagnetic field. A graphite foam conductor is disposed within the electromagnetic field. The graphite foam when exposed to the time-varying electromagnetic field conducts an induced electric current, the electric current heating the graphite foam. An energy conversion device utilizes light energy from the heated graphite foam to perform a light energy consuming function.

The graphite foam can have a thermal conductivity of at least 40 W/mK. The graphite foam can have a thermal conductivity of between 40-100 W/mK. The graphite foam can have a thermal conductivity of at least 220 W/mK. The graphite foam can have a thermal conductivity of between 220-240 W/mK.

The specific thermal conductivity of the graphite foam can be at least 109 W cm$^3$/mKg. The specific thermal conductivity of the graphite foam can be between 109-200 W cm$^3$/mKg. The graphite foam can have a specific thermal conductivity greater than four times that of copper.

The graphite foam can have a porosity of at least 69%. The graphite foam can have a porosity of at least 85%. The graphite foam can have a porosity of between 69%-85%.

The time varying electromagnetic field can have a frequency of between 25 kHz-1 MHz. The time varying electromagnetic field can have a frequency of at least 180 kHz. The time varying electromagnetic field can have a frequency of less than 10 MHz. The time varying electromagnetic field can have a frequency of less than 2 MHz.

The time varying electromagnetic field can have a power of at least 1 kW. The time varying electromagnetic field can have a power of between 10 W-20 kW.

The graphite foam can be derived from a pitch selected from the group consisting of petroleum-derived mesophase pitch, petroleum derived isotropic pitch, coal-tar-derived mesophase pitch, synthetic mesophase pitch, and synthetic isotropic pitch.

The graphite foam can have an X-ray diffraction pattern as depicted in FIG. 8. The graphite foam can have an X-ray diffraction pattern exhibiting doublet peaks at 2θ angles between 40 and 50 degrees.

The energy conversion device can be a light bulb. The graphite foam can be within an electrically non-conductive housing.

The apparatus can include a sensor for sensing an energy output from at least one of the graphite foam and the energy conversion device. A feedback control circuit can control the exposure of the time varying electromagnetic field based upon the sensed energy output.

A device for producing light includes an electromagnetic field source for generating a time-varying electromagnetic field. A graphite foam conductor is disposed within the electromagnetic field that is generated by the source. The graphite foam when exposed to the time-varying electromagnetic field conducts an induced electric current. The electric current heats the graphite foam to produce light. A bulb can at least partially cover the graphite foam conductor. A layer of thermal insulative material can be disposed between the bulb and the electromagnetic field source. A cover can be provided over the bulb. The cover can be colored. The light can be visible light. The light can be infrared light. The device can further include a switch for selectively energizing the electromagnetic field source.

A method of converting energy includes the steps of: a) providing an electromagnetic field source for generating a time-varying electromagnetic field; b) providing a graphite foam conductor disposed within the electromagnetic field, the graphite foam when exposed to the time-varying electromagnetic field conducting an induced electric current, the electric current heating the graphite foam to produce light; and c) providing an energy conversion device and utilizing light energy from the heated graphite foam to perform a light energy consuming function. The graphite foam can be heated to between 600-1000° C. in 15 seconds.

The energy conversion step can be emitting light. The light can be visible light. The light can be infrared light.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

A magneto-energy apparatus includes an electromagnetic field source for generating a time-varying electromagnetic field. A graphite foam conductor is disposed within the electromagnetic field. The graphite foam when exposed to the time-varying electromagnetic field conducts an induced electric current, the electric current heating the graphite foam to produce light. An energy conversion device utilizes light energy from the heated graphite foam to perform a light energy consuming function.

The manner in which the electromagnetic field is applied to the graphite foam can vary. The source should be placed in such proximity to the graphite foam that the electromagnetic field sufficiently cuts through the foam to generate a sufficient induced current to satisfy the heating requirements of the particular application. The graphite foam can be provided within an electrically non-conductive housing. It has been found that an efficient arrangement for positioning the source about the graphite foam is to wrap conductive coils of the source about the graphite foam, and particularly about a non-conductive housing that surrounds the foam. The energy conversion device can be a light bulb.

Figure 1:
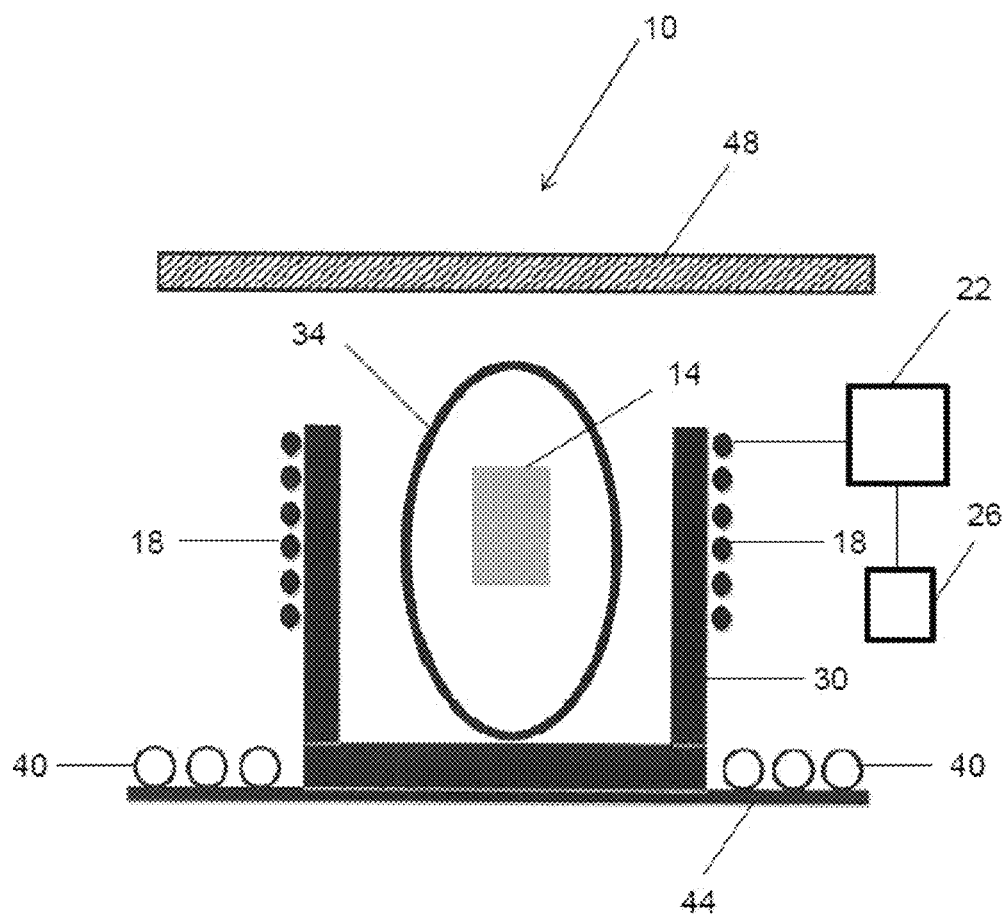
FIG. 1 is a schematic diagram of an infrared signal generation device according to the invention.

Many shapes and sizes of enclosures can be utilized. Any suitable non-conducting enclosure material can be used. There is shown in FIG. 1 a signaling device 10 according to the invention. The signaling device 10 comprises a graphite foam element 14 that can be mounted in any suitable manner. The graphite foam element 14 is in proximity to a source of a time varying electromagnetic field such as current conducting coil 18 which can be connected to a time-varying current supply 22. The coil 18 can be made of any suitable size, shape and material of conductor. A control 26 in the form of switching and other current controlling electronics and optionally a processor can be provided. A thermally insulative enclosure 30 can be provided to reduce heat losses from the graphite foam element 14. Any suitable shape, design or material for the thermally insulative enclosure is possible. The insulation could be a carbon foam, rather than a graphite foam, as carbon foam is transparent to the AC field. In some embodiments such as that shown it can be useful to wrap the coils 18 of the conductor around the thermally insulative enclosure 30. An enclosure 34 can be provided for the graphite foam element 14 to protect the element 14 from degradation due to rain, dust, oil or other chemical contact, or mechanically derived damage such as dents and cracks. The enclosure 34 can also permit the maintenance of desired gases or gas pressures/vacuum around the graphite foam element 14. Enclosure 34 can be shaped to lens the IR light to the proper angle of dispersion required to spread the light in a broad field of view. The coils 18 in an alternative embodiment can be provided inside the enclosure bulb 34.

Other structure can be provided with the signal generator of the invention. In FIG. 1 there is shown a plurality of LED lights 40 that can be mounted to a circuit board 44 in proximity to the graphite foam element 14. The LED or other visible light sources are used in some aircraft signaling applications, for example airport runways, and accordingly the combination of visible light and infrared detectable signals in a single package lighting structure can have many advantages over multiple separate lighting schemes. A cover 48 can be provided to protect the lighting structure from chemical or mechanical damage, and to prevent fires should fuel or oil be dumped over the hot graphite foam element. The cover 48 would be made from an IR transparent material such as high density polyethylene of a ceramic window material. Materials made from olefin monomers such as polyethylene, polypropylene, polymethylpentene, polybutene-1, among others are transparent to long wavelength radiation (7 to 14 micrometers). The cover 48 can also impart a color to the light emitted from the structure, can focus or disperse the light as desired, or provide other useful benefits for the particular application.

The graphite foam can have a thermal conductivity of at least 40 W/mK. The graphite foam can have a thermal conductivity of between 40-100 W/mK. The graphite foam can have a thermal conductivity of at least 220 W/mK. The graphite foam can have a thermal conductivity of between 220-240 W/mK.

The specific thermal conductivity of the graphite foam can be at least 109 W cm³/mKg. The specific thermal conductivity of the graphite foam can be between 109-200 W cm³/mKg. The graphite foam can have a specific thermal conductivity greater than four times that of copper. The graphite foams have been calculated to be over 95% efficient in the conversion of electricity to heat.

The graphite foam can have a porosity of at least 69%. The graphite foam can have a porosity of at least 85%. The graphite foam can have a porosity of between 69%-85%. The porosity can be as high as 89% and as low as 67%. The foam can have interconnected or isolated cells (pores).

The time varying electromagnetic field can have any suitable frequency. In one aspect, the time varying electromagnetic field has a frequency of between 25 kHz-1 MHz. The time varying electromagnetic field can have a frequency of at least 180 kHz. The time varying electromagnetic field can have a frequency of less than 10 MHz. The time varying electromagnetic field can have a frequency of less than 2 MHz. The foam is an integral part of the resonant circuit. The power supply runs on a resonant circuit LC (inductor capacitor) or LCR (inductor capacitor resistor) also known as a tank circuit. The foam adds inductance to the working induction coil.

The time varying electromagnetic field can have any suitable power level. In one aspect, the time varying electromagnetic field has a power of at least 1 kW. The time varying electromagnetic field can have a power of between 10 W-20 kW. Some applications will require power of between 1-5 kW, or 1-10 kW, or 1-20 kW. Some applications will require lower power levels, for example 10-500 W or 10-1 kW. A power greater than 5 kW can be used where faster heating rates and higher temperatures are desired.

The wavelength of light that is generated by the signaling device can vary. For aviation uses wavelengths of between 500-1700 nm are desirable. The optimal wavelength can in part be dictated by the detection device or camera that is being utilized. Wavelengths of between 700-1500 nm are preferred for poor weather conditions. Wavelengths of up to 12 microns are possible.

A method of converting energy includes the steps of: a) providing an electromagnetic field source for generating a time-varying electromagnetic field; b) providing a graphite foam conductor disposed within the electromagnetic field, the graphite foam when exposed to the time-varying electromagnetic field conducting an induced electric current, the electric current heating the graphite foam to produce light; and, c) providing an energy conversion device and utilizing light energy from the heated graphite foam to perform a light energy consuming function. The energy consuming function can be emitting light. The light can be visible light. The light can be infrared light.

The graphite foam can be derived from any suitable carbonaceous starting material and can be prepared by any suitable process. In one aspect the carbon foam is prepared from a pitch selected from the group consisting of petroleum-derived mesophase pitch, petroleum derived isotropic pitch, coal-tar-derived mesophase pitch, synthetic mesophase pitch, and synthetic isotropic pitch.

Experiment

Graphite foam has been found to be extremely efficient in coupling with a radio frequency (RF) alternating current induction field. In an experiment at the Oak Ridge National Laboratory (ORNL), a 4000 W AC field was used to heat the graphite foam to over 600° C. in 10 seconds (see FIG. 5). The temperature was recorded with a FLIR infrared camera. The calculated heating rate is between 50 and 100° C./sec. It is believed that the modulation in heating rate is a result of the inductance of the foam changing with temperature, and the controller has to adjust the frequency of the AC field, and the heating rate rises again. This happens slowly until a maximum temperature is reached.

Two different foams in two different geometries were evaluated, an open cellular graphite foam and a higher thermal conductivity foam with a smaller cell size. The term P1 was given to the type of pitch used to make all three foams and the term HD was used for High-Density foams. These were foams made at 1000 psi versus 400 psi and which result in smaller, high density foam cells. Therefore P1 HD represents P1 foam made at 1000 psi and P1 represents foam made at 400 psi. In addition, when an additive was used with the pitch to adjust the pore size it was represented by the percentage of the additive and the name of the additive. Hence, P1 HD+10% Graphite is P1 foam made with 10% graphite powder by weight and foamed at 1000 psi. Table 1 below details the foams made under this project.

TABLE 1

Experimental foams.

| ID | Pitch | Foaming Pressure | Additive |
| --- | --- | --- | --- |
| P1 | P1 | 400 psi | n/a |
| P1 HD | P1 | 1000 psi | n/a |
| P1 HD + 10% Graphite | P1 | 1000 psi | 10% graphite |

A copper coil was used as an induction coil to heat the foam. As the magnetic field moves the electrons within the graphite, the movement produces heat. A PVC pipe placed between the coil and the foam does not heat because the PVC is not an electrically conductive material. Therefore, the induction field created by the induction coil passes freely through the PVC pipe without resulting in any electrical flow in the PVC material. Other non-conducting materials could be utilized. The graphite foam is an electrical conductor, and high-frequency induction fields induce electrical currents that dissipate electrical energy, resulting in heating.

The results indicate that the number of turns of the coil can significantly affect performance of the device. A doubling of the number of turns on the coil from three to six doubled the temperature for the P1 HD+10% graphite. It can be projected that subsequent increases in the number of turns would, to a point, have a similar effect. The results were also affected by the amount of power supplied to the coils. Increasing the power supplied to the coils will increase in the change in temperature as well. The relationship between applied power and temperature of the foam is shown in Table 2 and FIG. 6.

TABLE 2

Induction heating of carbon foam.

| Amps | Watts | Temp C. | Freq kHz |
| --- | --- | --- | --- |
| 0 | 0 | 24 | 0 |
| 50.4 | 187 | 150 | 181 |
| 100.8 | 1071 | 460 | 177 |
| 150 | 2063 | 650 | 180 |
| 239.4 | 4323 | 800 | 181 |

Figure 2:
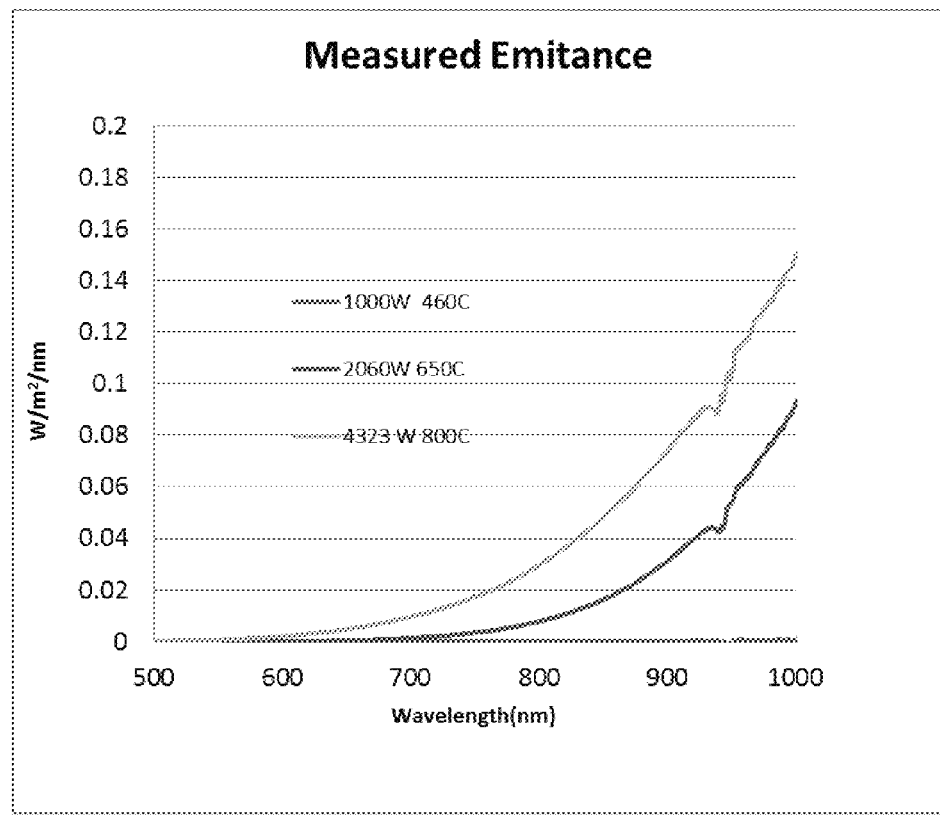
FIG. 2 is a plot of measure emittance W/m²/nm as a function of wavelength (nm).

Several experiments were conducted at different power levels, showing that the maximum temperature of the foam could be controlled by reducing the power input through the AC induction field (FIG. 2). There is shown in FIG. 2 the measured emittance of a device according to the invention as a function of wavelength and applied power/temperature. A spectral imager was used to measure the IR output at wavelengths from 100 to 1000 nm. The results indicate that the foam has an extremely high emissivity (>0.99). This is significant for the use of the foam to generate IR energy for signaling purposes.

Figure 3:
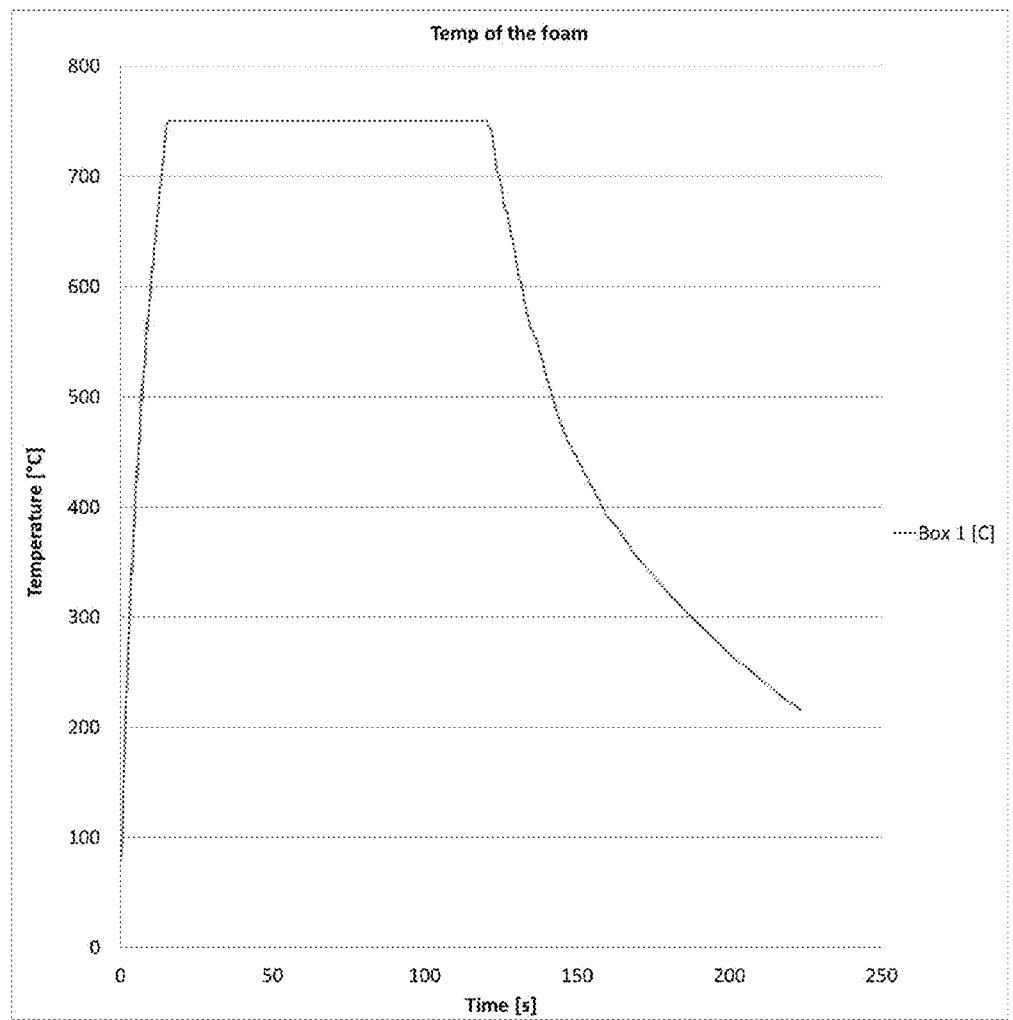
FIG. 3 is a plot of temperature versus time for a graphite foam in a magneto-energy apparatus.
Figure 4:
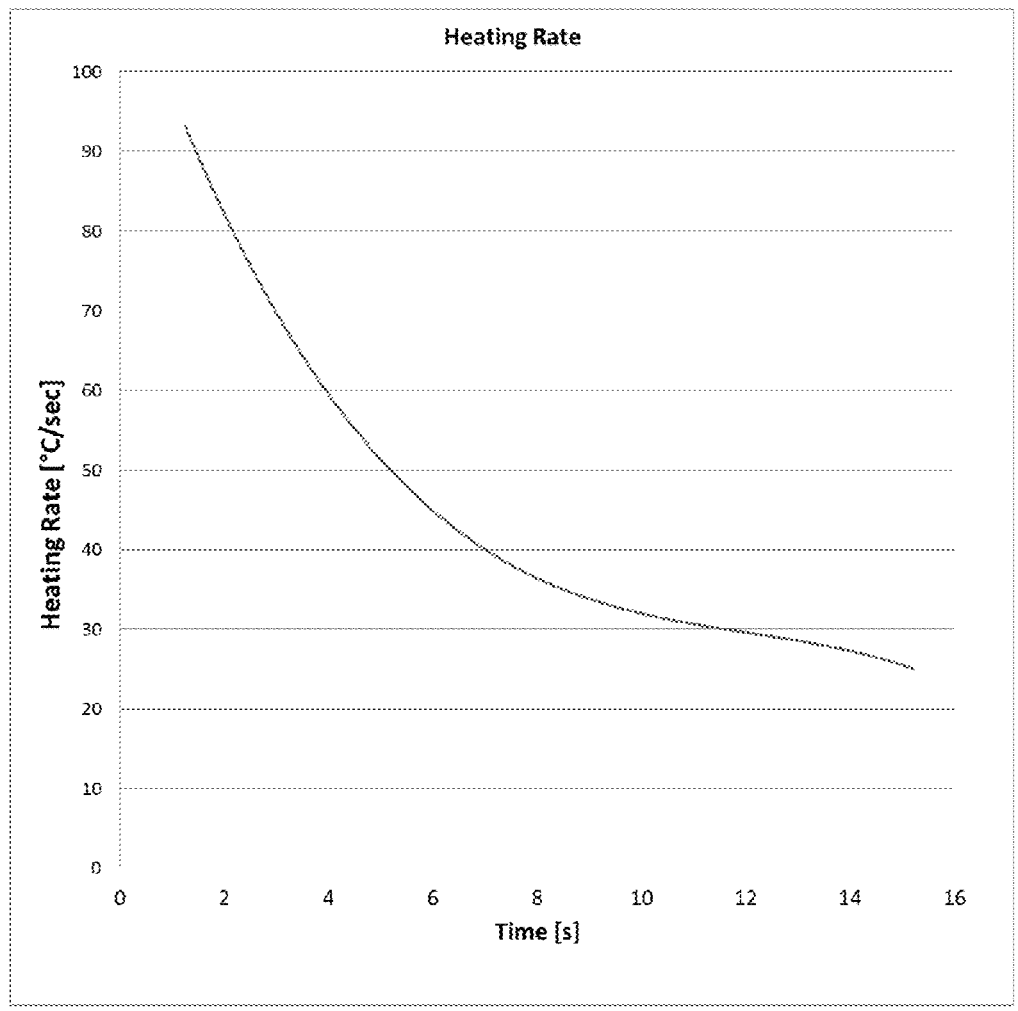
FIG. 4 is a plot of heating rate (° C./s) versus time (s) for a graphite foam in a magneto-energy apparatus.
Figure 5:
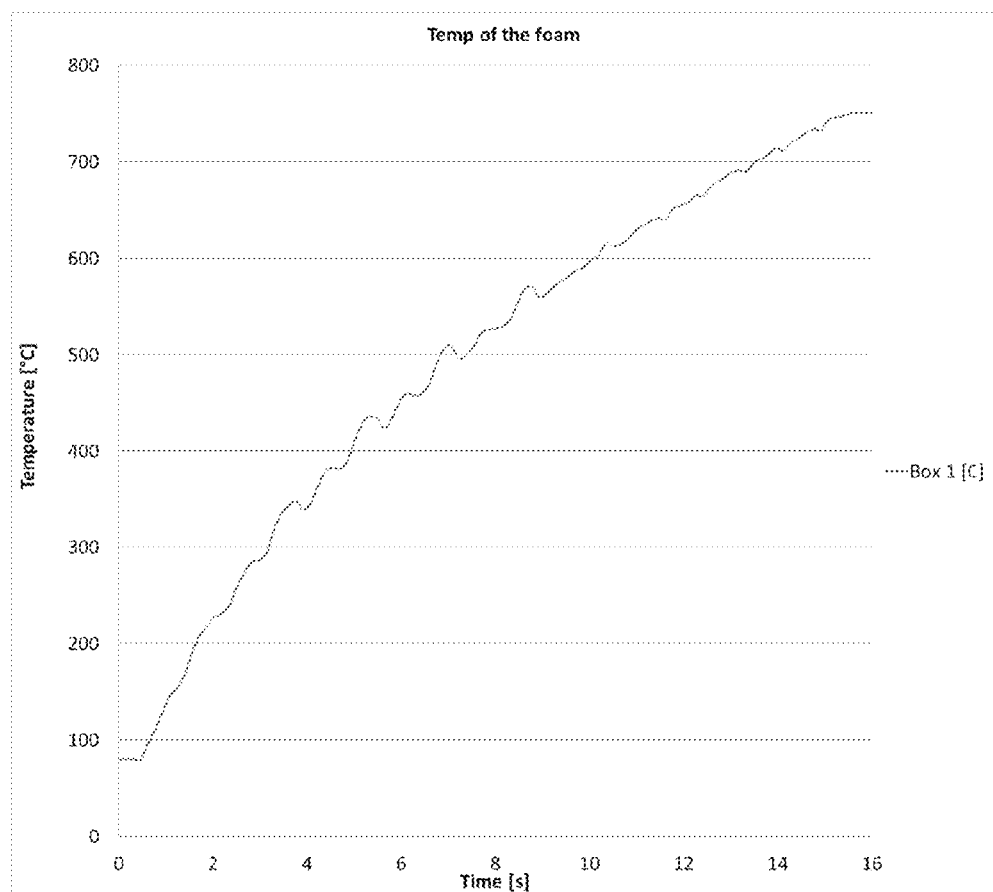
FIG. 5 is a plot of temperature (° C.) versus time (s) for a graphite foam in a magneto-energy apparatus.
Figure 6:
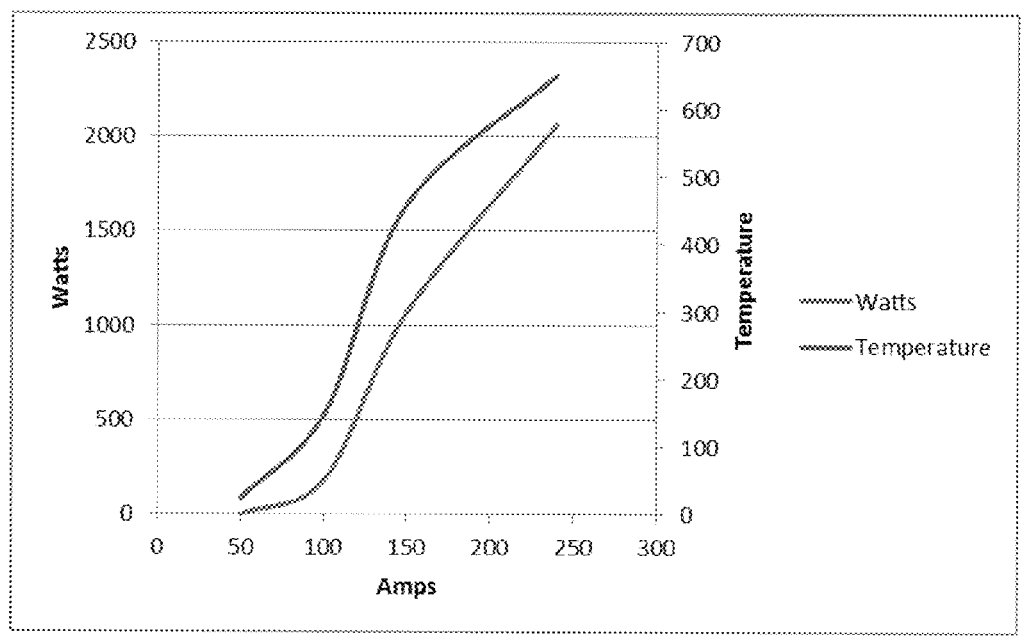
FIG. 6 is a plot of power and temperature as a function of applied amperage.

FIG. 3 illustrates the very fast temperature ramp rate once the power is applied. It is important to note that the maximum temperature of the IR camera is 750 C, so any temperature at this point is most likely over this temperature, but was not measured due to limits of camera. FIG. 4 illustrates the cyclic nature of the heating rate with time. FIG. 5 illustrates the fast ramp rates and temperatures attained by the graphite foam. The graphite foam is very receptive to an AC induction field. A sample of the foam was placed in an AC induction field and heated to over 600° C. (glowing red hot), or to 600-1000° C., within 15 seconds. FIG. 5 shows the heating rate of a 1" diameter block of foam by 3" long in an induction field. FIG. 6 shows the close relationship between the applied amperage and the resulting graphite foam power and temperature. This indicates that a foam system can be controlled to reach desired temperatures as needed by controlling the current to the AC field. From this curve, the total power output of the foam can be integrated with the results shown in Table 3. A piece of foam with a total surface area of only 1 cm² would emit nearly 8 W of IR energy, detectable by an IR imager on a plane. This is significant as the requirement for the LED lights to replace runway lights is 8 W of power across the wavelengths of 760 nm to 1100 nm. As expected by the plots in FIG. 6, there will be a significant increase in power levels from 1000 nm to 1100 nm.

TABLE 3

Integrated power across spectrum.

| Integrated Power | W/cm² (750 nm-1000 nm) |
|---|---|
| 460C | 0.05 |
| 650C | 7.73 |
| 800C | 16.90 |

Figure 7:
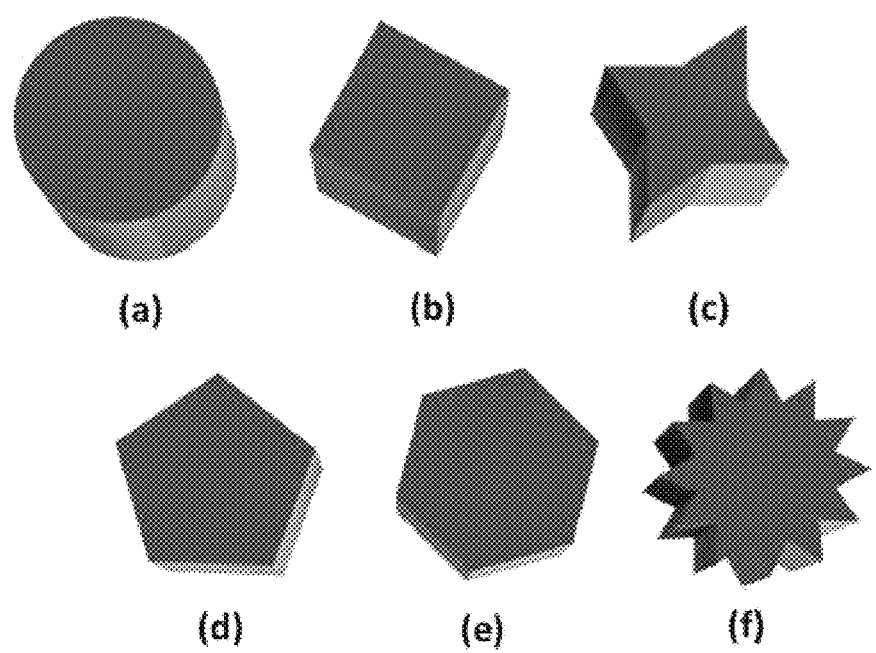
FIG. 7(a-f) are perspective views for differing foam geometries.
Figure 8:
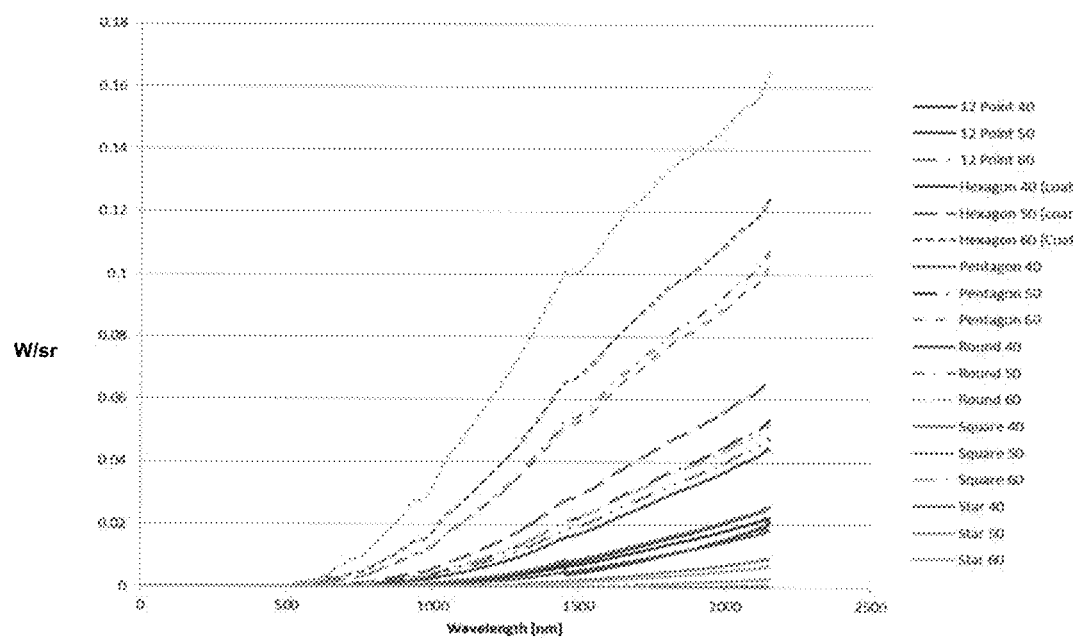
FIG. 8 is a plot of radiant intensity (W/sr) vs wavelength (nm) at different power levels for different shapes of carbon foam.
Figure 9:
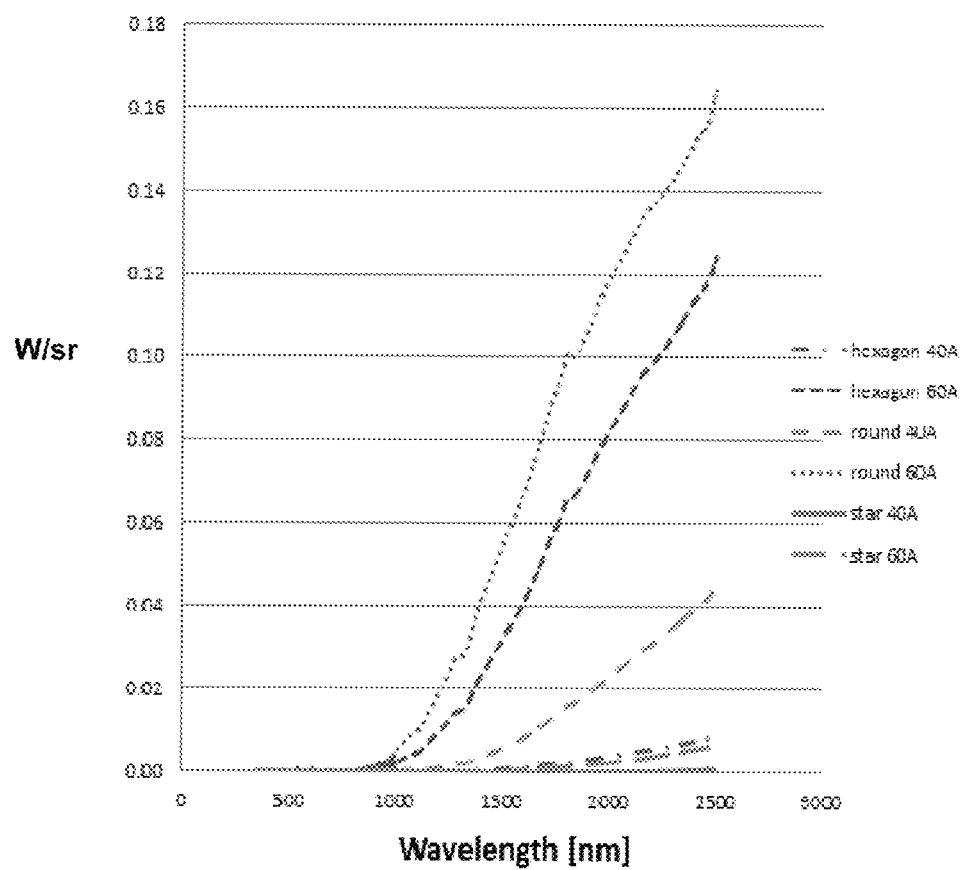
FIG. 9 is a plot of radiant intensity (W/sr) vs. wavelength at different power levels for different shapes of carbon foam.

There is shown in FIG. 7(a-f) perspective views for differing foam geometries including (a) round (b) square; (c) star; (d) pentagon; (e) hexagon; and (f) 12 point. Other geometries are possible. FIG. 8 is a plot of radiant intensity (W/sr) vs wavelength (nm) at different power levels for the different shapes of carbon foam. The hexagon (coated) is a bulb that was painted with a thermal insulation from Aremco, Valley Cottage, N.Y. (Aremco 542). The coated bulb exhibits a significantly higher temperature. This is due to the insulation effect of preventing waste heat loss. FIG. 9 is a plot of radiant intensity (W/sr) vs. wavelength at different power levels for carbon foam in hexagon, round and star shapes. Integrating yields the total radiant intensity (W/sr) emitted. This was calculated and the results are shown in Table 4.

TABLE 4

Integrated radiant intensity for different carbon foam geometries.

| | Watts/steradian | |
|---|---|---|
| | 40A | 60A |
| Hexagon - Insulated | 0.57 | 20.02 |
| Round | 3.96 | 33.33 |
| Star | 0.01 | 0.27 |

It is possible to provide the carbon foam in a bulb with gases or a vacuum within the bulb surrounding the carbon foam. Conduction of heat through a gas follows the relationship $$k \propto \frac{C_v}{\sigma^2}\sqrt{\frac{T}{MW}}$$

where k is conductivity, $C_v$ is specific heat capacity (constant volume), T is temperature, and MW is molecular weight. It is well know from both this relationship and engineering experience that the heaver noble gases offer good thermal insulation. In contrast, helium (and hydrogen) are notably good thermal conductors and should not be used as fill in the graphite foam bulb. The lowest heat conduction is achieved under vacuum conditions (thermal conductivity, k=0); however, argon is low at k=0.016 (W/m K); krypton is better insulating at k=0.0088 (W/m K); and xenon is lower at 0.0051 (W/m K). Although vacuum is preferred, one of these noble gases at reduced pressure (about 1 Torr) can offer acceptable thermal performance. Other molecular gases such as sulfur dioxide and sulfur hexafluoride also offer low thermal conductivity but are reactive especially at high temperatures as would be encountered in the infrared bulb.

Figure 10:
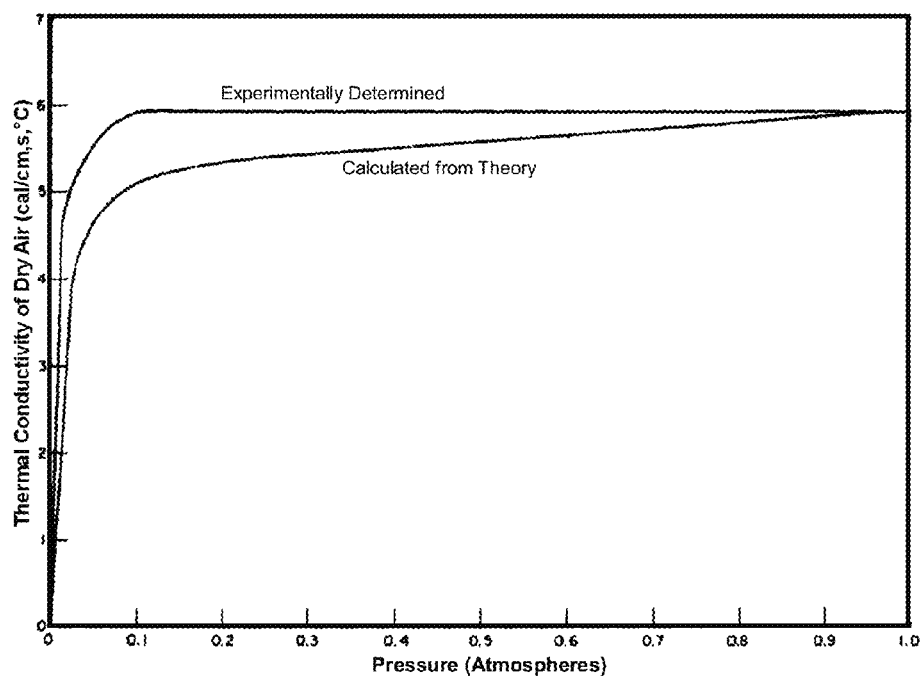
FIG. 10 is a plot of thermal conductivity of dry air (cal/cm, s, ° C.) vs pressure (Atm) for experimental and calculated thermal conductivities of air at several pressures (from C. C. Minter, Effect Of Pressure On The Thermal Conductivity Of A Gas, U.S. Naval Research Laboratory, Feb. 20, 1963, Report number 5907).

Interpreting from the pressure-conductivity graph shown in FIG. 10, about 1 Torr of air pressure will result in 0.1 the thermal conductivity at standard atmospheric conditions. Conductivity of air and argon behave roughly the same as pressure is reduced. Argon, having ⅔ the conductivity of air, will produce k=0.0016 (W/m K) at about 1 Torr of pressure.

Figure 11:
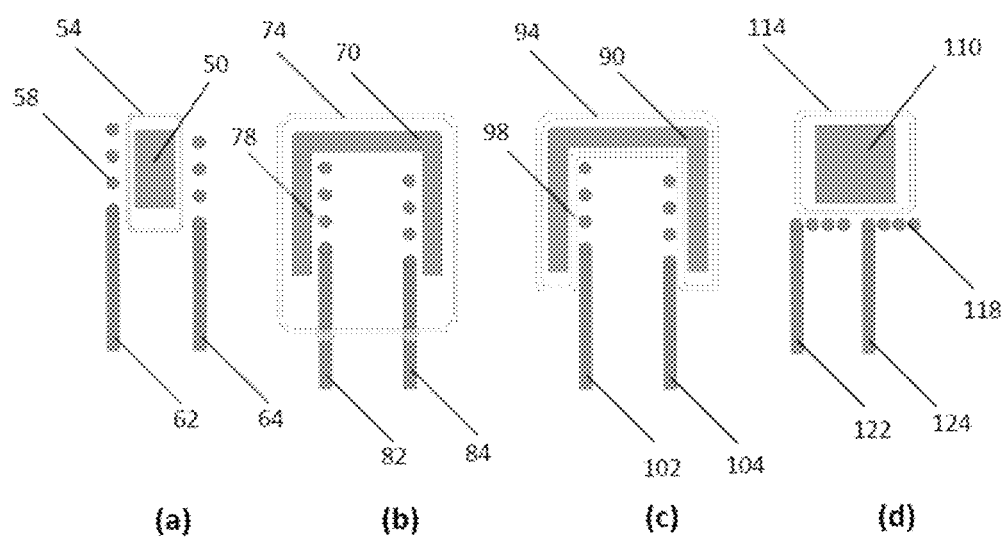
FIG. 11(a-d) are several embodiments of an apparatus induction coil and volume of graphite foam.

The graphite foam's temperature is raised to an operating level by resistive heating caused by eddy currents induced by an external alternating magnetic field. Different coil arrangements are possible. There is shown in FIG. 11(a) a graphite foam bulb 50 sealed in fused silica 54 located in the core of a solenoid induction coil 58 having terminals 62 and 64. There is shown in FIG. 11 (b) a graphite foam bulb 70 surrounding a solenoid induction coil 78 with a silica-to-metal seal 74 and terminals 82 and 84. There is shown in FIG. 11(c) a graphite foam bulb 90 sealed in shaped fused silica containment 94 and surrounding a solenoid induction coil 98 having terminals 102 and 104. There is shown in FIG. 11(d) a wide aspect ratio graphite foam bulb 110 sealed in fused silica 114 above a pancake induction coil 118 having terminals 122 and 124.

The coils shown in FIG. 11 when driven to high current at sufficiently high frequency induce a mirror current (through the action of dB/dt) in a nearby conductor such as carbon foam. The mirror current heats the carbon through I²R, where I is the induced current and R is the equivalent resistance of the graphite. For efficiency, it is desired that the resistivity of the coil material, typically copper, is much less than that of the graphite. FIG. 11 shows several embodiments of a coil and graphite volume combination. The topology shown in FIG. 11(a) is a simple topology in which the graphite is contained within an evacuated capsule of fused silica and held in the core of the solenoid. Heating takes place within the shallow region defined by the skin depth. A one e-fold depth (which captures about 64 percent of the energy) in graphite at 300 kHz is approximately 5 mm (with a 3000 micro-ohm-cm resistivity). Copper by comparison has a skin depth of about 0.12 mm. This 20:1 ratio is also advantageous is forcing the majority of power to be dissipated in the graphite foam.

Other topologies as shown in the FIGS. 11(b) and (c) include the inside-out format in which the coil is placed inside the graphite component. The field lines are more diffuse outside the solenoid core and therefore this configuration may be somewhat less efficient. However, advantages include infrared emission from sides that is not occluded by the coil windings. The topology shown in FIG. 11(d) is the pancake coil in which the heating accomplished from one side only. Once again, an advantage is emission available from all but one side. The magnetic field lines however are not used as efficiently.

Figure 12:
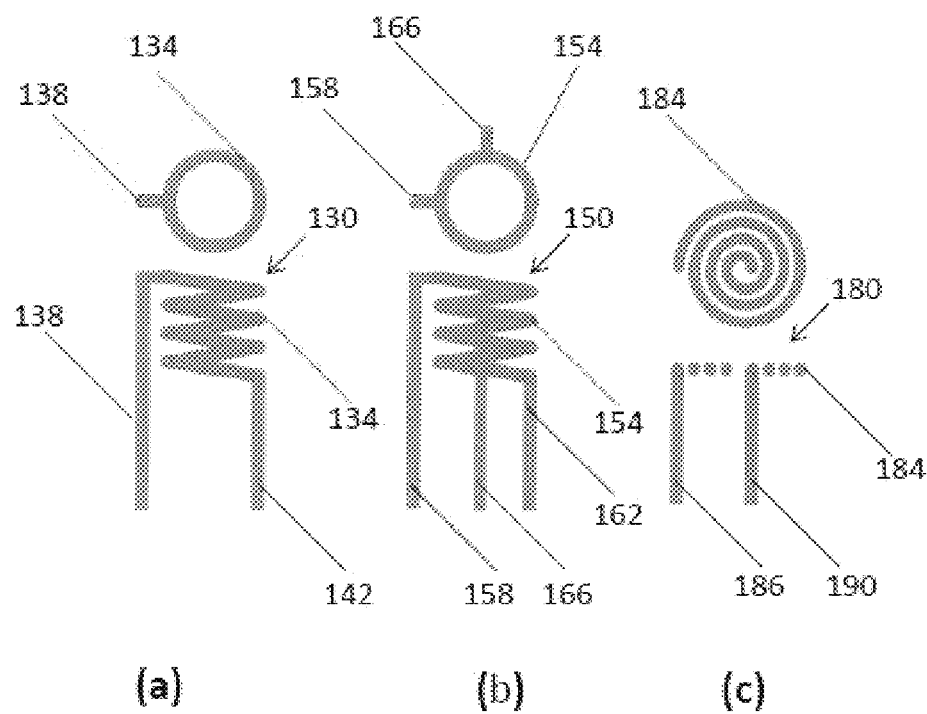
FIG. 12(a-c) are plan and side elevations of several embodiments of coil constructions as related to heating a volume of graphite foam.

The illustration in FIG. 12 contains three coil designs: (a) single layer two terminal solenoidal wound induction heating coil (typical 3 to 5 turns), (b) single layer center-tapped solenoidal wound induction coil (typical 3 to 5 turns), and (c) single layer spiral wound induction heating coil (typical 3 to 5 turns) (eg., pancake). The single layer induction coil 130 has coil turns 134 and terminals 138 and 142. The single layer center-tapped induction coil 150 has turns 154 and terminals 158 and 162, and a center tap 166. The single layer induction coil 180 has a single layer coil 184 and terminals 186 and 190. The coil sizes for the infrared lighting system can range from 0.75 to 1 inch inside diameter. The spiral design may range from 1.125 to 1.5 inches. Smaller as well as larger diameters are feasible and may be deployed depending of the amount of infrared emission desired. An upper limit of several inches may be feasible. The center-tapped coil is useful for push-pull drivers. The push-pull drivers have an advantage that lower drive voltages are possible to achieve significant tank circuit currents. Coil wire diameter can range from 14 AWG to 6 AWG. Smaller gauges may be feasible for lower power systems. Likewise, larger wire gauges can be used for power designs of up to several hundred watts to a kilowatt. Round or square tubing (such as soft copper refrigeration tubing) may be used. A significant advantage may be realizable by litz wire, in which several hundred individually insulated strands of copper wire are bundled to permit the entire cross section of wire to be conductive (the skin effect is applied to each individual strand rather than the whole solid copper cross section). Another coil design embodiment is to wind the coil from high aspect ratio copper (width to thickness ratios greater than 20:1. For example, a copper strip may be 200 to 400 microns thick and 8 mm wide; the coil would be wound flat. Other dimensions are possible.

Figure 13:
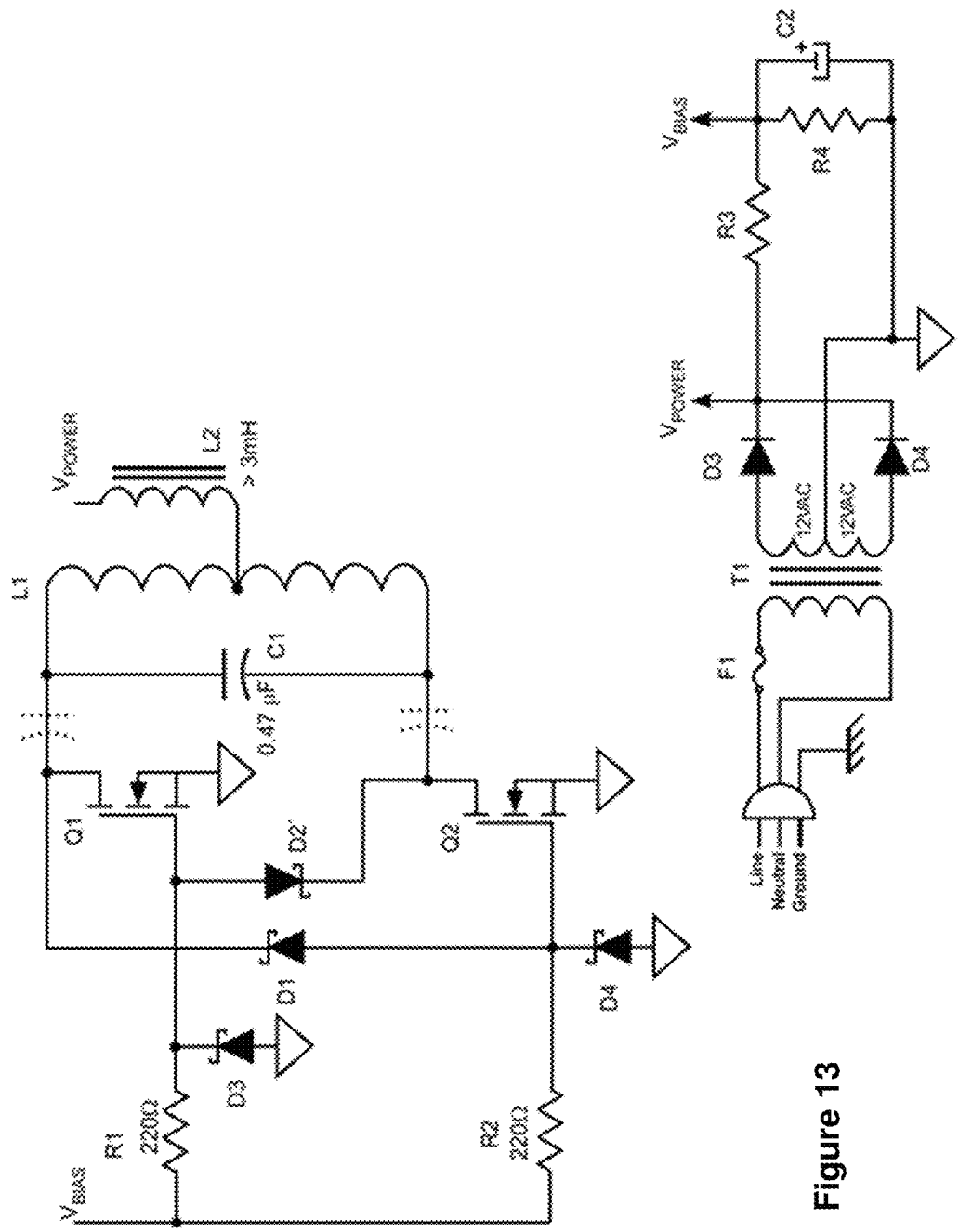
FIG. 13 is an illustrative electrical schematic diagram of a self-oscillating induction coil driver using a center-tapped induction coil.

Driving a roughly one cubic cm volume of graphite foam to about 700° C. has been accomplished using a 4-turn coil of ⅛ inch refrigeration tubing having less than 60 amps of 330 kHz coil current using a drive circuit similar to that of FIG. 13.

The concept of induction heating drive is to provide high currents to a coil at a desired frequency that is selected by choosing the desired skin depth in a material. For graphite foam of several cm thickness, a frequency of 200 kHz to 400 kHz is a reasonable range. About 200 kHz is at the upper operating frequency of insulated gate bipolar junction transistors (IGBTs). Metal Oxide Field Effect transistors (MOSFETs) are better suited to frequencies above 200 kHz. Several oscillator-driver circuit topologies are possible for driving the graphite foam emitter. FIG. 13 illustrates a push-pull MOSFET driver that is self-oscillating. The circuit as shown can operate on low voltage (12-20 VDC) with a frequency in the range of 300 kHz (depending on coil inductance). Other frequencies are possible and operation at higher voltages (above 200 volts) is feasible by increasing coil inductance and reducing parallel capacitance; such a change lowers the circulating current but maintains the amp-turns ratio. The capacitors shown as dotted are optional—they prevent catastrophic failure in case of a shorted transistor or failure to start oscillation. The circuit of FIG. 13 is a variation of the 1954 Royer oscillator originally used with vacuum tubes. The circuit is somewhat inefficient because the MOSFETs are operating in either class A, AB, or B range (depending on bias) and therefore have linear response during part of the cycle, which leads to dissipative transistor loss (FR heating).

Figure 14:
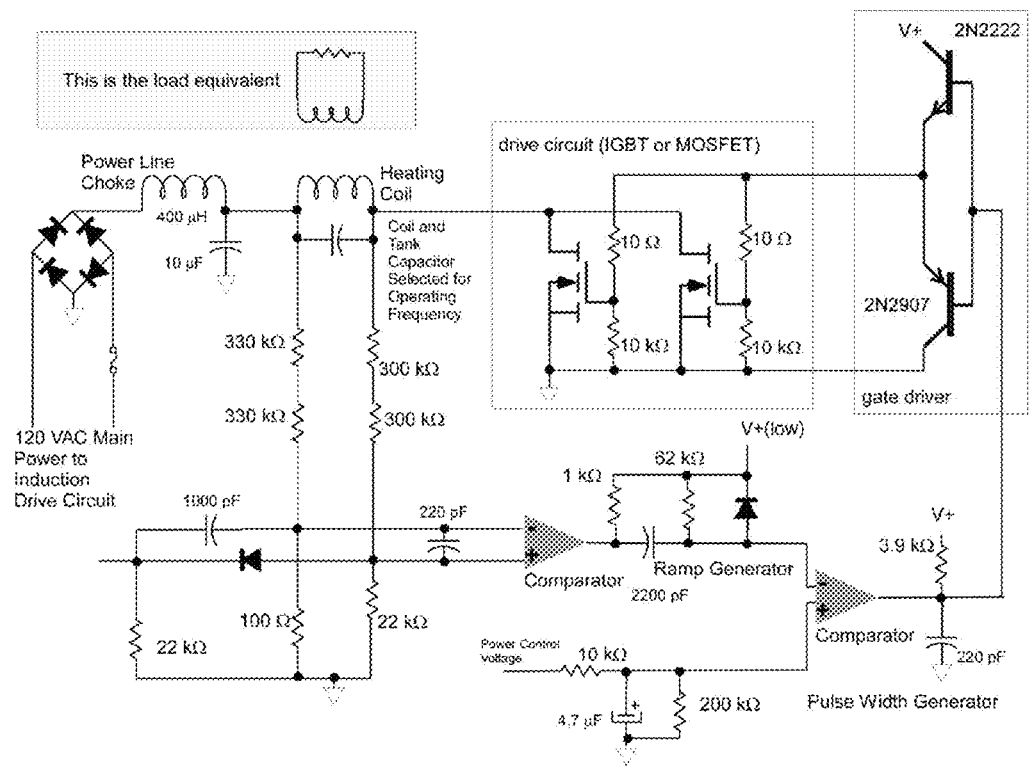
FIG. 14 is an illustrative electrical schematic diagram depicting a high efficiency induction coil drive circuit whose drive power is also continuously controllable by an input voltage.

Another circuit that can be applied to graphite foam heating and emission is the simplified single-ended driver circuit of FIG. 14. This circuit uses switch action comparators to force the MOSFETs into switching action rather than linear conduction. The heat dissipation in the transistors comes from FR heating from residual resistance in the full on state and some small amount of linear action since the transistors are not infinitely fast. The circuit shows two MOSFETs, which may not be required for lighting less than 100 watts.

The apparatus can include a sensor for sensing an energy output from at least one of the graphite foam and the energy conversion device. A feedback control circuit can control the exposure of the time varying electromagnetic field based upon the sensed energy output. This control can be achieved by any suitable method, such as varying the current flow through the coil, varying the position of the coil relative to the graphite foam through a feedback-driven positioning drive motor, or other methods.

Figure 15:
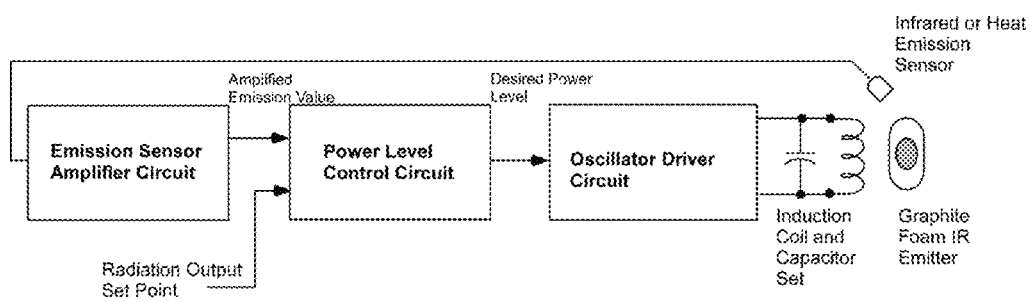
FIG. 15 is an illustrative electrical circuit diagram of a circuit arrangement to achieve closed loop feedback control of graphite foam infrared emission.

The block diagram of FIG. 15 shows a system to achieve closed-loop feedback control of the infrared emission from graphite foam. A sensor measures the emission either as heat or as photon emitted. The sensor is placed near an emission region of the graphite. A sensor can be a photodiode, phototransistor, photocell, thermistor, thermopile, thermocouple, or an RTD. The sensor can be mounted near the graphite-foam-containing bulb. The bulb and its associated insulating mounting structure can be manufactured to have an optical window in the bottom section specifically to allow emitted light to shine on the sensor.

The sensor signal is amplified to a voltage level sufficient to signal a control circuit in which the sensor signal is compared with a reference signal (the desired output level) and an error signal is developed. The error signal, being dynamic, is treated with further amplification including the action of integration and differentiation to produce a drive signal to the oscillator-coil-driver block (typically called proportional integral derivative, PID control). Other mathematical treatments of the sensor signal are possible including optimal control, model based control, fuzzy logic, and neural networks. However, as a low-cost alternative that will meet the needs of most lighting applications, the proportional-integral method of feedback control will be sufficient.

One of the benefits of feedback control implemented in this manner is that all manufactured infrared lamps will have consistent output emission independent of manufacturing differences in the graphite foam bulb, induction coil, as well as the applied line voltage, which can vary.

Power output of the driver circuits can be controlled by varying the amplitude of the voltage applied to the coil-capacitor tank circuit (and hence the circulating current) or by varying the timing of when the tank circuit is kicked by the drive transistors. These control methods can be accomplished in an analog implementation (i.e., continuously varying) or by entirely gating the power supply on and off with a duty cycle. For the example driver circuit of FIG. 13, either or both control methods of continuous or duty cycle can be applied:

1. Adjust applied voltage ($V_{power}$) in FIG. 13
2. Adjust bias voltage ($V_{bias}$) in FIG. 13
3. Duty cycle modulate the applied voltage ($V_{power}$) in FIG. 13
4. Duty cycle modulate bias voltage ($V_{bias}$) in FIG. 13

Similarly, for the example driver circuit of FIG. 14, either or both control methods can be applied:

1. Adjust power control voltage in FIG. 14
2. Duty cycle modulate power control voltage in FIG. 14

These adjustment and/or duty cycle modulation controls are accomplished to set the emitted infrared output of the graphite foam to a specific value. As described previously, these controls can be derived by a comparison of the measured emission from the sensor indicated in FIG. 15 with a pre-established reference value. Because of the long time constant associated with heating the graphite foam (several tens of seconds to minutes), off-on modulation can be applied in the time range from fractions of a second (e.g., 0.01 s) to several seconds (up to ten seconds). The long thermal time constant of the graphite foam integrates the power so that no appreciable fluctuation of the emitted output is detectable.

Light from the surrounding environment (e.g., daylight) can be measured by a separate sensor (not the sensor described above) to determine the required amount of output as a function of ambient conditions. The ambient light sensor would be used to adjust the reference output (Radiation Output Set Point of FIG. 15) up or down to accommodate the ambient lighting (e.g., full daylight to nighttime operation). In addition to the ambient lighting adjustment, other (exogenous) inputs can be accepted to the infrared lamp system to modify its output emission thus accommodating local conditions. For example, an airport fog-detection system can provide a signal that indicates the need to increase infrared output of the lamp because of the presence of fog, smoke, or haze. The input can be implemented as a separate signal wire, a wireless communication, or over power-line carrier.

The invention has application to many types of heating techniques and devices. The graphite foam heats faster than other carbon structures such as the blocks of graphite typically used as a susceptor, as well as carbon fibers. Typical graphite skin penetration is about 11 mm @~180 kHz (for an 8000 micro-ohm-cm resistivity material), although this will vary with frequency and power. Skin depth is a strong function of frequency but not of power. The total intensity is a function of power; however, the distribution of Eddy currents across the surface is not strongly related to power.

The wall thickness of a graphite foam can in one example be between about 50-100 microns. The wall thickness will depend on the actual foam structure. The effective depth of penetration of the foam can therefore in one example be up to 110 mm using AC Induction heating.

In addition, internal surfaces that absorb energy may radiate the heat, but it is absorbed by the cell, so effectively there is total internal absorption of the heat. The surface of the foam will radiate heat outward, and this will cause the generation of radiation for observation. There will be convection losses also.

Example—Process of Making the Foam

Any suitable method of making the foam can be utilized. A process of producing a suitable carbon foam can include selecting an appropriate mold shape. Pitch is introduced into the mold to an appropriate level. Air is purged from the mold. The pitch is heated to a temperature sufficient to coalesce the pitch into a liquid. An inert fluid at a static pressure of up to about 1000 psi is applied to the pitch. The pitch is heated to a temperature sufficient to cause gases to evolve and foam the pitch. The pitch is then heated to a temperature sufficient to coke the pitch. The foam is cooled to room temperature with a simultaneous release of pressure to produce a carbon foam. The carbon foam is heated to temperatures high enough to convert the structure within the ligaments and cell walls to graphite.

Pitch powder, granules, or pellets are placed in a mold with the desired final shape of the foam. These pitch materials can be solvated if desired. In this Example Mitsubishi ARA-24 mesophase pitch was utilized. A proper mold release agent or film is applied to the sides of the mold to allow removal of the part. In this case, boron nitride spray and dry graphite lubricant were separately used as a mold release agent. If the mold is made from pure aluminum, no mold release agent is necessary since the molten pitch does not wet the aluminum and, thus, will not stick to the mold. Similar mold materials may be found that the pitch does not wet and, thus, they will not need mold release. The sample is evacuated to less than 1 torr and then heated to a temperature approximately 50 to 100° C. above the softening point. In this case where Mitsubishi ARA24 mesophase pitch was used, 300° C. was sufficient. At this point, the vacuum is released to a nitrogen blanket and then a pressure of up to 1000 psi is applied. The temperature of the system is then raised to 800° C., or a temperature sufficient to coke the pitch which is 500° C. to 1000° C. This is performed at a rate of no greater than 5° C./min. and preferably at about 20° C./min. The temperature is held for at least 15 minutes to achieve an assured soak and then the furnace power is turned off and cooled to room temperature. Preferably the foam was cooled at a rate of approximately 1.5° C./min. with release of pressure at a rate of approximately 2 psi/min. Final foam temperatures for three product runs were 500° C., 630° C. and 800° C. During the cooling cycle, pressure is released gradually to atmospheric conditions. The foam was then heat treated to 1050° C. (carbonized) under a nitrogen blanket and then heat treated in separate runs to 2500° C. and 2800° C. (graphitized) in Argon.

Figure 16:
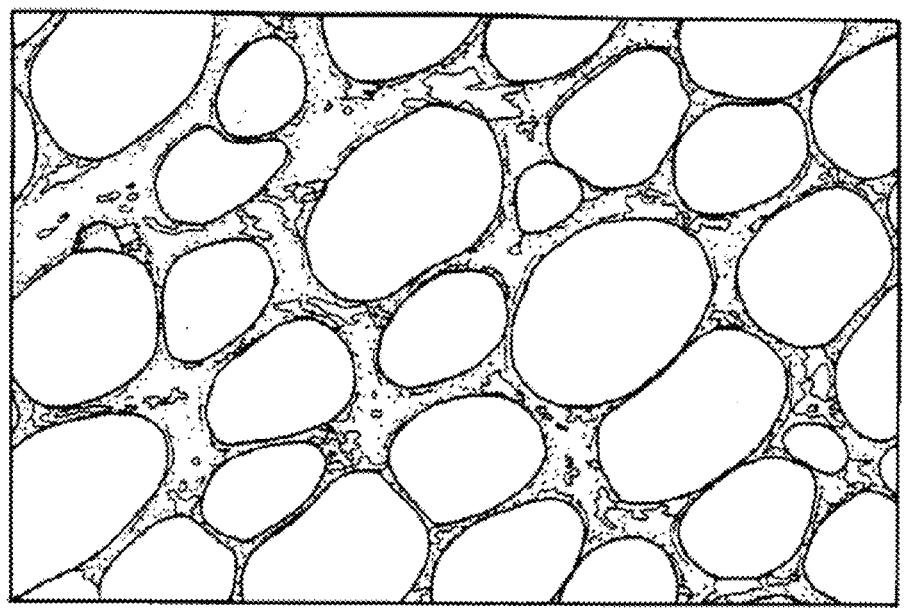
FIG. 16 is diagram of graphitic foam suitable for use with the invention.

Carbon foam produced with this technique was examined with photomicrography, scanning electron microscopy (SEM), X-ray analysis, and mercury porisimetry. The interference patterns under cross-polarized light indicated that the struts of the foam are completely graphitic. That is, all of the pitch was converted to graphite and aligned along the axis of the struts. These struts are also similar in size and are interconnected throughout the foam. The foam therefore has high stiffness and good strength. As seen in FIG. 16, the foam is open cellular meaning that the porosity is not closed. Mercury porisimetry indicated that the pore sizes are in the range of 90-200 microns.

A thermogravimetric study of the raw pitch was performed to determine the temperature at which the volatiles are evolved. The pitch loses nearly 20% of its mass fairly rapidly in the temperature range between about 420° C. and about 480° C. Although this was performed at atmospheric pressure, the addition of 1000 psi pressure will not shift this effect significantly. Therefore, while the pressure is at 1000 psi, gases rapidly evolved during heating through the temperature range of 420° C. to 480° C. The gases produce a foaming effect (like boiling) on the molten pitch. As the temperature is increased further to temperatures ranging from 500° C. to 1000° C. (depending on the specific pitch), the foamed pitch becomes coked (or rigid), thus producing a solid foam derived from pitch. Hence, the foaming occurs before the release of pressure. Heating the pitch in a similar manner, but under only atmospheric pressure, causes the pitch to foam significantly more than when it is heated under pressure. The resulting foam is so fragile that it could not even be handled to perform tests.

Samples from the foam were machined into specimens for measuring the thermal conductivity. The bulk thermal conductivity ranged from 58 W/m·K to 106 W/m·K. The average density of the samples was 0.53 g/cm³. When weight is taken into account, the specific thermal conductivity of the pitch derived foam is over 4 times greater than that of copper. The specific thermal conductivity of the graphite foam is at least 109 W cm³/mKg. The specific thermal conductivity of the graphite foam can be between 109-200 W cm³/mKg. Further derivations can be utilized to estimate the thermal conductivity of the struts themselves to be nearly 700 W/m·K. This is comparable to high thermal conductivity carbon fibers produced from this same ARA24 mesophase pitch.

Figure 17:
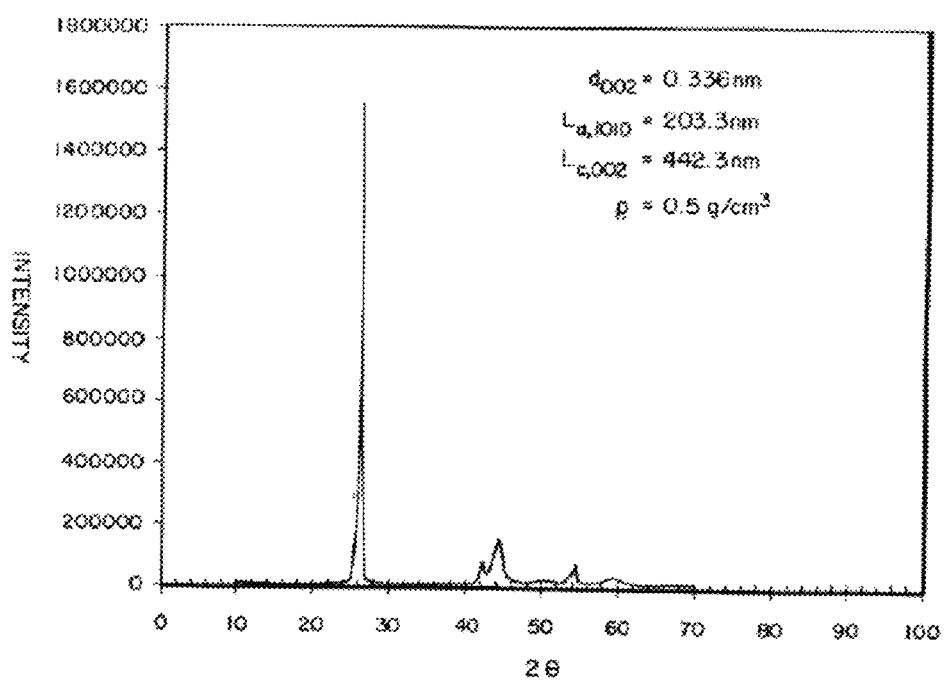
FIG. 17 is an X-ray analysis of graphitic foam used in the invention.

X-ray analysis of the foam was performed to determine the crystalline structure of the material. The results are shown in FIG. 17. From this data, the graphene layer spacing ($d_{002}$) was determined to be 0.336 nm. The coherence length (La, 1010) was determined to be 203.3 nm and the stacking height was determined to be 442.3 nm. The graphite foam can have an X-ray diffraction pattern exhibiting doublet peaks at 2θ angles between 40 and 50 degrees.

The compression strength of the samples was measured to be 3.4 MPa and the compression modulus was measured to be 73.4 MPa. The foam sample was easily machined and could be handled readily without fear of damage, indicating a good strength.

Examples will show the diversity of graphite foams that are suitable for the invention.

Foam Example 1

Density—0.55 g/cc
Thermal Conductivity—80-100 W/mK
Porosity—75%
Starting Material: Koppers L1 Mesophase Pitch Foam Example 2

Density—0.7 g/cc
Thermal Conductivity 220-240 W/mK
Porosity—69%
Starting Material: Koppers P1 Mesophase Pitch Foam Example 1 will produce a foam with higher porosity, more suitable for flowing a fluid through the foam to heat the fluid. Foam Example 2 will produce a foam with more closed porosity, and suitable for heating an object by radiation, conduction, or flowing a fluid over the outside of the structure. This will have high pressure drop if a fluid is attempted to flow through the pores of the foam.

Example Comparative Test

A 40 foot PVC tube was fitted with an IR emitter installed at one end, and a blue LED installed at the same end. A fogging machine was set up to inject fog into the PVC tube every 5 feet. Small fans were installed every 5 feet to swirl the fog and keep it from settling. The fogging machines have a dial knob to control amount of fogging—settings were at the 50%, 58%, 67%, 75%, and 83% of the full capability of the dial. An incandescent 150 Watt light bulb was used to replace the IR emitter to compare the results at the end of the IR emitter testing.

TABLE 5

Comparative testing

| Fog Setting | Green Laser Distance [ft] | Blue Laser Visible | IR Emitter Visible | 100 Watt Incandescent Bulb Visible |
|---|---|---|---|---|
| No fog | Full | YES | YES | YES |
| 50% Setting | 25 | YES | YES | NO |
| 58% Setting | 10 | YES | YES | NO |
| 67% Setting | 7.5 | YES | YES | NO |
| 75% Setting | 5 | YES | YES | NO |
| 83% Setting | 4.5 | NO | YES (barely) | NO |
| 100% Setting | 3 | NO | NO | NO |

The fog settings were manually adjusted and are not accurately repeatable due to nature of knob on fogger. The incandescent light bulb appeared to totally wash out the IR detector in the tube in the no fog case, but during the first test with the fog at 50% setting, it took about 2 minutes for the signal to totally disappear. It appears that the IR signal from the filament is not passing through the bulb, but heating the glass of the bulb, and that the signal is a larger signal than the IR emitter, thus washing out the camera. When the fog is at even a low setting (50%), the fog totally blocked the signal as the IR signal is from the surface of the glass that is at only 200 C at most, compared to 450-600 C for the IR emitter. This is believed to be why the IR emitter is so successful at penetrating the fog. The IR emitter was measured to use about 65 Watts of power in the current state. It is estimated that when the circuit is enhanced to drive directly from 110V, the power will drop about ⅔rds. It has been shown that Pyrex lenses can be used with little effect on the IR emissions in the current wavelengths of issue.

The invention has many possible applications. These include, but are not limited to, commercial office buildings, security, warehouses, factories, garages, parking lots, street lights, municipal buildings, government facilities, airport terminals, control towers, heliports and heliport facilities and installations, airport cargo bays, fire and rescue buildings, airfields, runways and taxiways, hospitals, oil rig platforms and helipads, obstruction lighting for towers, buildings and high terrain, airlines, corporate aircraft, helicopters, general aviation, Department of Defense, security, intelligence, customs, surveillance and reconnaissance, unmanned aircraft vehicles, and drones. In airports the uses include runway edge lights, ramp lights, instrument lights, runway center line, runway perimeter, and others. Maritime uses include buoys, navigation markers, and ships lighting, search & rescue, bridges and planning, digital navigation charts, port and harbor piloting, coastal surveillance UAVs, offshore oilrig safety and operations, and DOD "pinpoint positioning" requirements.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the bread of the range.

This invention can be embodied in other forms without departing from the spirit or essential attributes thereof, and accordingly, reference should be had to the following claims to determine the scope of the invention.

We claim:

1. A magneto-energy apparatus, comprising:
   an electromagnetic field source for generating a time-varying electromagnetic field;
   a porous graphite foam conductor disposed within the electromagnetic field, the porous graphite foam conductor comprising a plurality of interconnected pores, the pores defined by pore walls having a wall thickness from 50 μm to 100 μm and the porous graphite foam conductor having a porosity of from 67%-89%;
   the porous graphite foam conductor when exposed to the time-varying electromagnetic field conducting an induced electric current, the electric current heating the porous graphite foam conductor to produce light.

2. The magneto-energy apparatus of claim 1, wherein the porous graphite foam conductor has a thermal conductivity of at least 40 W/mK.

3. The magneto-energy apparatus of claim 1, wherein the porous graphite foam conductor has a thermal conductivity of between 40 W/mK-100 W/mK.

4. The magneto-energy apparatus of claim 1, wherein the porous graphite foam conductor has a porosity of at least 75%.

5. The magneto-energy apparatus of claim 1, wherein the porous graphite foam conductor has a thermal conductivity of at least 220 W/mK.

6. The magneto-energy apparatus of claim 1, wherein the porous graphite foam conductor has a thermal conductivity of between 220 W/mK-240 W/mK.

7. The magneto-energy apparatus of claim 1, wherein the porous graphite foam conductor has a porosity of at least 69%.

8. The magneto-energy apparatus of claim 1, wherein the porous graphite foam conductor has a porosity of between 69%-85%.

9. The magneto-energy apparatus of claim 1, wherein a specific thermal conductivity of the porous graphite foam conductor is at least 109 W cm$^3$/mKg.

10. The magneto-energy apparatus of claim 1, wherein a specific thermal conductivity of the porous graphite foam conductor is between 109 W cm$^3$/mKg-200 W cm$^3$/mKg.

11. The magneto-energy apparatus of claim 1, wherein the time varying electromagnetic field has a frequency of between 25 kHz-180 kHz.

12. The magneto-energy apparatus of claim 1, wherein the time varying electromagnetic field has a frequency of between 180 kHz-10 MHz.

13. The magneto-energy apparatus of claim 1, wherein the time varying electromagnetic field has a power of at least 1 kW.

14. The magneto-energy apparatus of claim 1, wherein the time varying electromagnetic field has a power of between 10 W-20 kW.

15. The magneto-energy apparatus of claim 1, wherein the porous graphite foam conductor is derived from a pitch selected from the group consisting of petroleum-derived mesophase pitch, petroleum derived isotropic pitch, coal-tar-derived mesophase pitch, synthetic mesophase pitch, and synthetic isotropic pitch.

16. The magneto-energy apparatus of claim 1, wherein the porous graphite foam conductor has an X-ray diffraction pattern as depicted in FIG. 17.

17. The magneto-energy apparatus of claim 1, wherein the porous graphite foam conductor has a specific thermal conductivity greater than four times that of copper.

18. The magneto-energy apparatus of claim 1, wherein the porous graphite foam conductor has an X-ray diffraction pattern exhibiting doublet peaks at 2θ angles between 40 degrees and 50 degrees.

19. The magneto-energy apparatus of claim 1, wherein the energy conversion device is a light bulb.

20. The magneto-energy apparatus of claim 1, wherein the porous graphite foam conductor is within an electrically non-conductive housing.

21. The magneto-energy apparatus of claim 1, further comprising a sensor for sensing an energy output from at least one of the porous graphite foam conductor and the energy conversion device, and a feedback control circuit for controlling the time varying electromagnetic field based upon the sensed energy output.

22. A device for producing light, comprising:
   an electromagnetic field source for generating a time-varying electromagnetic field;
   a porous graphite foam conductor disposed within the electromagnetic field, the porous graphite foam conductor comprising a plurality of interconnected pores, the pores defined by pore walls having a wall thickness from 50 μm to 100 μm and the porous graphite foam conductor having a porosity of from 67%-89%;
   the porous graphite foam conductor when exposed to the time-varying electromagnetic field conducting an induced electric current, the electric current heating the porous graphite foam conductor to produce light; and,
   a bulb at least partially covering the conductor graphite foam conductor.

23. The device of claim 22, further comprising a layer of thermal insulative material disposed between the bulb and the electromagnetic field source.

24. The device of claim 22, further comprising a cover over the bulb.

25. The device of claim 22, further comprising a sensor for sensing the produced light, and a feedback control circuit for controlling the time varying electromagnetic field based upon the sensed light output.

26. The device of claim 22, wherein the produced light is visible light.

27. The device of claim 22, wherein the produced light is infrared light.

28. A method of converting energy, comprising the steps of:
   providing an electromagnetic field source for generating a time-varying electromagnetic field;
   providing a porous graphite foam conductor disposed within the electromagnetic field, the porous graphite foam conductor comprising a plurality of interconnected pores, the pores defined by pore walls having a wall thickness from 50 μm to 100 μm and the porous graphite foam conductor having a porosity of from 67%-89%;
   the porous graphite foam conductor when exposed to the time-varying electromagnetic field conducting an induced electric current, the electric current heating the porous graphite foam conductor to produce light.

29. The method of claim 28, wherein the energy conversion step is emitting light.

30. The method of claim 29, wherein the light is visible light.

31. The method of claim 29, wherein the light is infrared light.

32. The method of claim 28, wherein the porous graphite foam conductor is heated between 600° C.-1000° C. in 15 seconds.

33. The method of claim 28, further comprising the step of sensing an energy output from at least one of the porous graphite foam conductor and the energy conversion device, and a feedback control circuit for controlling the time varying electromagnetic field based upon the sensed energy output.

34. The method of claim 33, wherein the sensed energy output is light.

* * * * *